(12) United States Patent
Weng et al.

(10) Patent No.: US 10,520,608 B2
(45) Date of Patent: Dec. 31, 2019

(54) METHOD AND APPARATUS FOR POWER SAVING IN GLOBAL NAVIGATION SATELLITE SYSTEM (GNSS) RECEIVERS

(71) Applicant: MEDIATEK INC., Hsin-Chu (TW)

(72) Inventors: Chin-Tang Weng, Hsinchu County (TW); Chih-Wei Chen, Hsinchu County (TW); Pei-Hung Jau, Tainan (TW); Cheng-Ming Hu, Tainan (TW); Bo-Wen Tung, New Taipei (TW); Zong-Hua You, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 354 days.

(21) Appl. No.: 15/024,851

(22) PCT Filed: Sep. 4, 2015

(86) PCT No.: PCT/CN2015/088924
§ 371 (c)(1),
(2) Date: Mar. 24, 2016

(87) PCT Pub. No.: WO2016/034144
PCT Pub. Date: Mar. 10, 2016

(65) Prior Publication Data
US 2016/0238712 A1 Aug. 18, 2016

Related U.S. Application Data

(60) Provisional application No. 62/046,170, filed on Sep. 5, 2014.

(51) Int. Cl.
*G01S 19/34* (2010.01)
*G01S 19/24* (2010.01)
*G01S 19/42* (2010.01)

(52) U.S. Cl.
CPC .............. *G01S 19/34* (2013.01); *G01S 19/24* (2013.01); *G01S 19/42* (2013.01)

(58) Field of Classification Search
CPC ........... G01S 19/34; G01S 19/24; G01S 19/42
(Continued)

(56) References Cited

U.S. PATENT DOCUMENTS

| 5,592,173 A * | 1/1997 | Lau | G01S 19/34 342/357.74 |
| 6,445,341 B2 * | 9/2002 | Hasegawa | G01S 19/23 342/357.65 |

(Continued)

FOREIGN PATENT DOCUMENTS

| CN | 101726726 A | 6/2010 |
| CN | 103428361 A | 12/2013 |
| TW | 201017203 A1 | 5/2010 |

OTHER PUBLICATIONS

"International Search Report" dated Dec. 17, 2015 for International application No. PCT/CN2015/088924, International filing date: Sep. 4, 2015.

*Primary Examiner* — Chuong P Nguyen
(74) *Attorney, Agent, or Firm* — Wolf, Greenfield & Sacks, P.C.

(57) ABSTRACT

Methods and apparatus are provided for power saving in GNSS receivers. In one novel aspect, the ME tracking period, the ME interval, and the PE working period, the PE interval are dynamically determined based on the GNSS signal conditions and/or the user requirements. In one embodiment, acceptable provision estimated position fix are used. Estimated position result is generated at each GPS position interval if there is no position result generated by the PE working period. In another embodiment, the ME-tracking and/or the PE-working are adjusted to minimum operation needs by using ME-partial (MEP) and/or PE- (Continued)

partial (PEP). PEP is arranged aligned with MEP. In yet another embodiment, the PE working period is delayed such that the PE working period is aligned with the ME tracking period. The position result is generated based on a last epoch's measurement obtained in the previous ME tracking period.

20 Claims, 4 Drawing Sheets

(58) Field of Classification Search
USPC .......................... 342/357.74, 357.71, 357.23
See application file for complete search history.

(56) References Cited

U.S. PATENT DOCUMENTS

| | | | | |
|---|---|---|---|---|
| 7,847,726 B2* | 12/2010 | Jia | ............................ | G01S 19/34 342/357.62 |
| 7,948,434 B2* | 5/2011 | van Diggelen | ......... | G01S 19/34 342/357.63 |
| 8,059,699 B2* | 11/2011 | Yeh | ........................ | G01S 19/34 375/150 |
| 8,310,393 B2* | 11/2012 | van Diggelen | ......... | G01S 19/34 342/357.25 |
| 8,531,333 B2* | 9/2013 | Leclercq | ................. | G01S 19/34 342/357.46 |
| 8,836,576 B2* | 9/2014 | Yeh | ........................ | G01S 19/34 342/357.74 |
| 8,948,781 B2* | 2/2015 | Wang | ...................... | G01S 19/34 455/456.1 |
| 9,274,229 B2* | 3/2016 | Abraham | ................ | G01S 19/34 |
| 9,766,348 B2* | 9/2017 | Abraham | ................ | G01S 19/34 |
| 2009/0109091 A1 | 4/2009 | Thind | | |
| 2010/0171659 A1 | 7/2010 | Waters | | |
| 2012/0218146 A1 | 8/2012 | Leclercq | | |
| 2013/0009811 A1* | 1/2013 | van Diggelen | ......... | G01S 19/34 342/357.25 |
| 2014/0218235 A1* | 8/2014 | Leclercq | ................. | G01S 19/34 342/357.63 |
| 2016/0154115 A1* | 6/2016 | Abraham | ................ | G01S 19/34 342/357.74 |
| 2016/0239073 A1* | 8/2016 | Deng | ..................... | G06F 1/163 |
| 2016/0349377 A1* | 12/2016 | Jarmuszewski | ......... | G01S 19/34 |
| 2017/0276797 A1* | 9/2017 | Hsieh | ..................... | G01C 21/14 |
| 2018/0041965 A1* | 2/2018 | Korneluk | .......... | H04W 52/0258 |

* cited by examiner

METHOD AND APPARATUS FOR POWER SAVING IN GLOBAL NAVIGATION SATELLITE SYSTEM (GNSS) RECEIVERS

CROSS REFERENCE TO RELATED APPLICATIONS

This application is a national stage filing under 35 U.S.C. § 371 of International Patent Application Serial No. PCT/CN2015/088924, filed Sep. 4, 2015, which claims the benefit of U.S. Provisional Application Ser. No. 62/046,170, filed on Sep. 5, 2014, the subject matter of which is incorporated herein by reference.

TECHNICAL FIELD

The disclosed embodiments relate generally to wireless communication, and, more particularly, to power saving in the global navigation satellite system (GNSS) receivers.

BACKGROUND

With the innovative development in the global navigation satellite system (GNSS) and growing consumer demands, the GNSS positioning has become a must-have feature in a wide range of the fast growing mobile devices, such as smartphones, tablets, personal navigation systems, and other consumer electronics devices. Consumers expect the GNSS positioning to be highly available with the least amount of power consumed. Improving the power consumption of the GNSS receiver is important for extending the battery life of the device with GNSS receiver.

The measurement engine (ME) unit in the GNSS receiver tracks satellite signals and executes satellite signal processing. The positioning engine (PE) unit executes the position calculation. The calculated results are provided to the user layer. The traditional way for power management in the GNSS receiver is performed by the duty cycle. Different ways are used to put the PE unit into sleep mode for a predefined number of duty cycles. While such methods provide ways to optimize the power consumption of the GNSS receiver, the optimization is not efficiency. It is bounded by the duty cycle of GNSS receiver and cannot be dynamically updated. The ME unit is not optimized. Unnecessary power consumption in the ME unit further reduces the power efficiency of the GNSS receiver.

Improvements and enhancements are needed for power saving operation arrangement of the GNSS signal processing and positioning task.

SUMMARY

Methods and apparatus are provided for power saving in GNSS receivers. In one novel aspect, the ME tracking period, the ME interval, and the PE working period, the PE interval are dynamically determined based on GNSS positioning data, such as the GNSS signal conditions and/or the user requirements. In one embodiment, the ME power saving parameters and the PE power saving parameters are determined independently. In one embodiment, the GNSS signal conditions include an intensity of satellite signal, a number of satellites, and satellite orbit data. The GNSS user requirements include a user power requirement, a user-position accuracy requirement, a user motion status, and a position update interval.

In one embodiment, further power saving is implemented by using acceptable provision estimated position fix. In this embodiment, the ME tracking is arranged periodically according to the required GPS position fix interval. PE working periods are also arranged periodically according to the required GPS position fix interval. Estimated position result is generated at each GPS position interval if there is no position result generated by the PE working period. In one embodiment, estimated results are computed by extra and interpolation from the recent position fix generated during the last PE working period.

In another embodiment, the GNSS receiver determines that a lower position accuracy is acceptable according to GNSS positioning data, such a user requirement data. The GNSS receiver configures the ME-tracking and/or the PE-working dynamically to be adjusted to minimum operation needs by using ME-partial (MEP) and/or PE-partial (PEP), where the ME unit and the PE unit achieve minimum operation. The ME unit operates under MEP is dynamically arranged according to signal intensity and/or user's motion status. Accordingly, when MEP mode is configured, PEP is arranged aligned with MEP.

In yet another embodiment, the ME-tracking period and PE-working period are aligned to save the power consumption further. The PE working period is delayed such that the PE working period is aligned with the ME tracking period. The position result is generated based on a last epoch's measurement obtained in the previous ME tracking period.

Further details and embodiments and methods are described in the detailed description below. This summary does not purport to define the invention. The invention is defined by the claims.

BRIEF DESCRIPTION OF DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
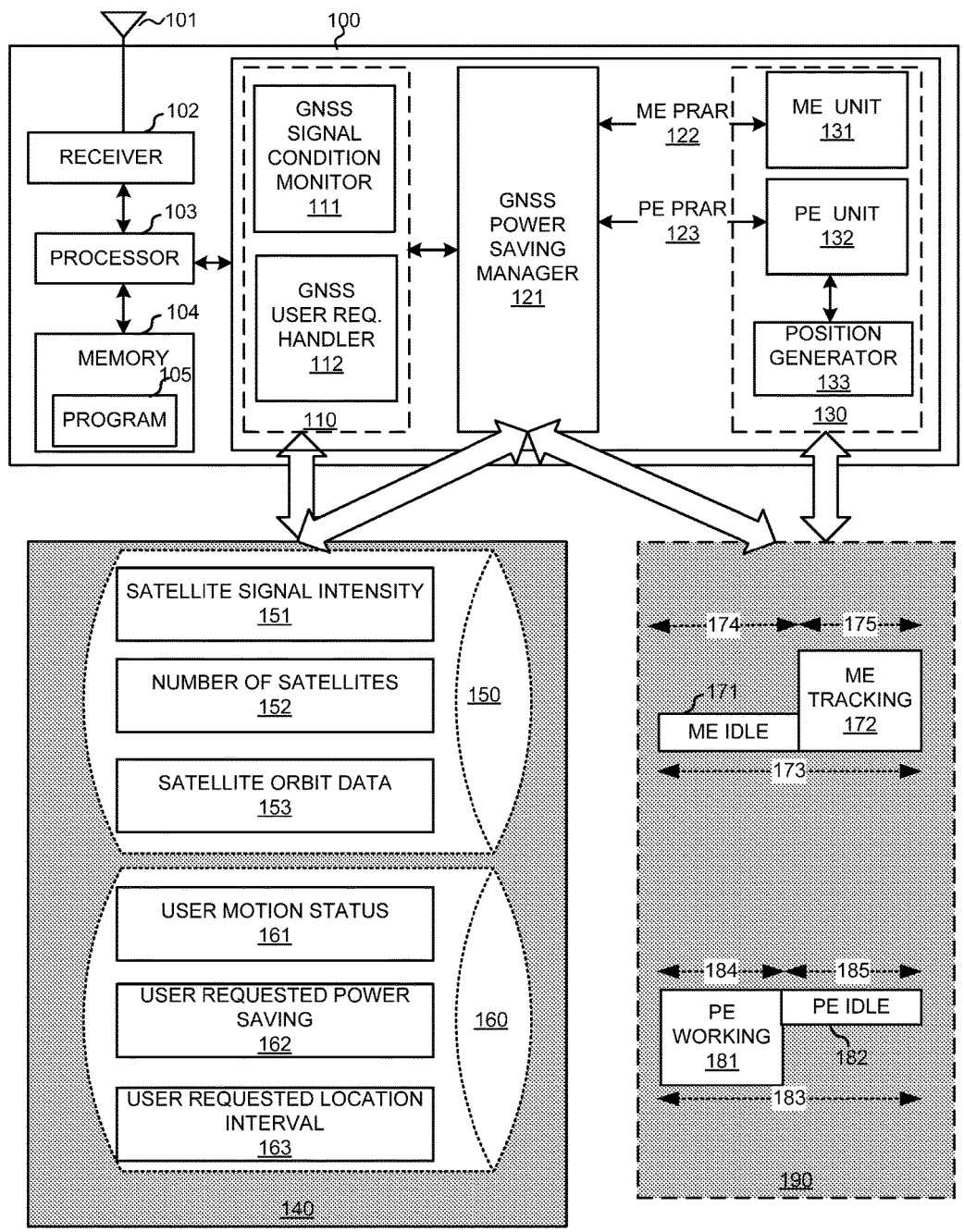
FIG. 1 shows simplified block diagrams of a GNSS receiver that performs dynamic power saving in accordance with embodiments of the current invention.

FIG. 1 shows simplified block diagrams of a GNSS receiver 100 that performs dynamic power saving in accordance with embodiments of the current invention. GNSS 100 has an antenna array 101 that receives satellite radio signals. A RF receiver module 102, coupled with the antenna, receives RF signals from antenna 01, converts them to baseband signals and sends them to processor 103. Processor 103 processes the received baseband signals and invokes different functional modules to perform features in GNSS 101. Memory 104 stores program instructions and data to control the operations of GNSS 100. GNSS 100 also includes a set of control modules, such as a GNSS configuration module 110, a GNSS power saving manager 121 and a GNSS power saving module 130 that carry out functional tasks to configure, schedule, execute power saving features for GNSS 100. GNSS configuration module 110 includes a GNSS condition monitor 111 and a GNSS user requirement handler 112. GNSS power saving manager 121 performs dynamic power saving tasks by receiving condition updates from GNSS configuration module 110. GNSS power saving module 130 includes an ME unit 131, a PE unit 132, and a position generator 133. GNSS power saving module 130 takes power saving parameters from GNSS power saving manager 121 and generates position results. GNSS receiver 100 also includes GNSS positioning data 140 that interacts with GNSS configuration module 110. GNSS positioning data 140 includes a GNSS signal conditions set 150 and a GNSS user requirements set 160. GNSS power saving manager 121 outputs GNSS power saving parameter set 190. GNSS power saving parameter set 190 includes an ME parameter set 122 that configures ME unit 131 and a PE parameter set 123 that configures PE unit 132.

GNSS receiver consists of two main function blocks, an ME unit 131 and a PE unit 132. ME unit 131 includes hardware components such as an RF front end, a baseband processor and software program that executes satellite signal processing. The satellite signal processing software performs different tasks such as the acquisition task and the tracking task. The acquisition task detects the visible satellites and provides, for each detected satellite, a coarse estimation. The coarse estimation is passed to the tracking task, which refines the estimation. PE unit 132 includes hardware components such as the application processor, the storage, the memory, and software program executing position calculation. The software stack of position calculation generally includes the time update, the measurement check, and the measurement update. The time update tasks may use different methods such as Kalman Filter's Prediction. The measurement check tasks may use methods such as receiver autonomous integrity monitoring (RAIM). The measurement update tasks may use methods such as Kalman Filter's Correction. Data is transferred from ME unit 131 to PE unit 132 for satellite measurement. Data is also transferred from PE unit 132 to ME unit 131 for satellite aiding data. After completion of the position calculating, position generator 133 generates position results and provides position results to an upper layer user. The upper layer user may display the position results in a user interface or pass the position results to other applications as input data.

In one novel aspect, the executing time of ME unit 131 and PE unit 132 is dynamically configured to achieve the power saving for GNSS receiver 100. A GNSS power saving manager 121 communicates with ME unit 131 to configure the ME tracking period/ME active period and the ME interval for ME 131 through ME parameter 122. GNSS power saving manager 121 also communicates with PE unit 132 to configure the PE working period/PE active period and the PE interval for PE 132 through PE parameter 123. In one embodiment, ME 131 performs signal processing in the ME tracking period and stays idle during the rest of the ME interval. PE 132 performs a position calculation in the PE working period and stays idle during the rest of the PE interval. The ME tracking period and the PE working period do not need to align with the duty cycle and can be dynamically updated based on detected conditions and/or user requirements.

In one embodiment, GNSS power saving manager 121 determines the ME tracking period, the ME interval, the PE working period and the PE interval based on at least one of the GNSS signal conditions and/or GNSS user requirements. GNSS power saving manager 121 communicates with GNSS configuration module 110 to get the updated conditions and user requirements. GNSS configuration module 110 includes GNSS signal condition monitor 111 that monitors GNSS signal conditions that would affect the GNSS power saving operation. GNSS configuration module 110 also includes GNSS user requirement handler 112 that monitors GNSS user requirements that would affect the GNSS power saving operation.

GNSS signal condition monitor 111 interacts with GNSS signal condition data 150 to detect changes and sends updates to GNSS power saving manager 121 to update dynamically power saving parameters such as ME parameter 122 and PE parameter 123. GNSS signal condition data 150 includes conditions including a satellite signal intensity 151, a number of satellites detected 152, a satellite orbit data 153. GNSS signal condition data 150 may include other condition related data that may affect the power saving operations. GNSS signal condition data 150 may be predefined or preconfigured. GNSS signal condition data 150 may also be dynamically updated through system configuration, user configuration or other means available to GNSS receiver 100.

Similarly, GNSS signal condition monitor 112 interacts with GNSS user requirement data 160 to detect changes and sends updates to GNSS power saving manager 121 to update dynamically power saving parameters such as ME parameter 122 and PE parameter 123. GNSS signal condition data 160 includes conditions including a user motion status 161, a user requested power saving 162, and a user requested location interval 163. GNSS signal condition data 160 may include other signal condition related data that may affect the power saving operations. GNSS signal condition data 160 may be predefined or preconfigured. GNSS signal condition data 160 may also be dynamically updated through system configuration, user configuration or other means available to GNSS receiver 100.

GNSS power saving manager 121 outputs GNSS power saving parameter set 190 based on the detected signal conditions and obtained user requirements. GNSS power saving parameter set 190 includes parameters for ME unit 131 and PE unit 132. An ME output includes an ME idle period 171 and an ME tracking period 172. The ME output has an ME interval with time period length of 173. ME idle period 171 has a period length of 174. ME tracking period 172 has a period length of 175. The length 173 of the ME interval equals the sum of ME idle period length 174 and ME tracking period length 175. In accordance with embodiments of the current invention, the output can be any combination of any two parameters of ME interval length 173, ME idle period length 174, and ME tracking period length 175. In one novel aspect, ME interval length 173, ME idle period length 174, and ME tracking period length 175 do not need to align with duty cycles and can be updated dynamically in response to changes of GNSS positioning data 140.

Similarly, a PE output includes a PE working period 181 and a PE idle period 182. The PE output has a PE interval with time period length of 183. PE working period 181 has a period length of 184. PE idle period 182 has a period length of 185. The length 183 of the ME interval equals the sum of PE working period length 184 and ME idle period length 185. In accordance with embodiments of the current invention, the output can be any combination of any two parameters of PE interval length 183, PE working period length 184, and ME idle period length 185. In one novel aspect, PE interval length 183, PE working period length 184, and PE tracking period length 185 do not need to align with duty cycles and can be updated dynamically in response to changes of GNSS positioning data 140.

Figure 2:
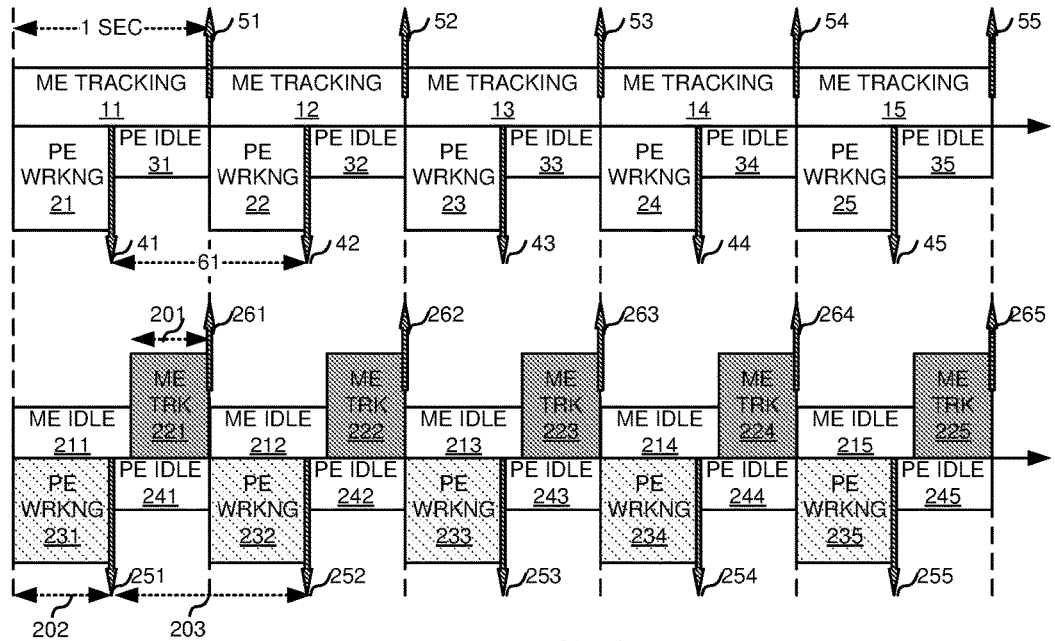
FIG. 2 shows an exemplary diagram of a GNSS power saving scheme that ME operates with configured ME tracking period and PE operates with configured PE working period in accordance embodiments of the current invention.

FIG. 2 shows an exemplary diagram of a GNSS power saving scheme that ME operates with configured ME tracking period and PE operates with configured PE working period in accordance embodiments of the current invention. FIG. 2 illustrates a traditional operation scheme for GNSS receiver. In one example, the GNSS receiver is configured with 1 Hz position fix. In the reference scheme, the ME tracking is always on. During each second period, ME tracking 11, ME tracking 12, ME tracking 13, ME tracking 14, and ME tracking 15 are always active. At the end of each ME tracking period, a measurement is performed. A measurement 51 is performed at the end of ME tracking 11. Measurements 52, 53, 54, and 55 are performed at the end of ME tracking 12, ME tracking 13, ME tracking 14, and ME tracking 15, respectively. The PE unit performs position calculation upon receiving the measurements from the ME unit. The PE unit goes back to idle upon completion of the calculation to save power. The PE tracking period is aligned with duty cycle. The PE unit performs calculation during PE working period 21 and outputs a position result 41 at the end of PE working period 21. The PE unit enters PE idle 31 after generating position result 41. Similarly, the PE unit performs calculation during PE working period 22, 23, 24, and 25. The PE unit outputs a position result 42, 43, 44, and 45 at the end of PE working period 22, 23, 24, and 25, respectively. The PE unit enters PE idle period 32, 33, 34, and 35 following generating position results 42, 43, 44, and 45, respectively. A position interval 61 is fixed between two position results. Although the scheme achieves power saving by putting the PE unit into idle after generating the position results, the power saving is not sufficient because it has to be aligned with duty cycles and does not change with conditions.

In one novel aspect, the ME tracking period and the PE working period can be updated dynamically based on detected GNSS positioning data, such as GNSS signal conditions and/or GNSS user requirements. As shown in FIG. 2, the ME unit is on for a portion of a configured ME interval. Each ME interval includes an ME tracking period and an ME idle period. For example, during an exemplary one-second interval, the ME unit is idle during ME idle 211 and performs tracking task during ME tracking period 221. At the end of ME tracking period 221, a measurement 261 is generated. Similarly, the ME unit is idle during ME idle 212, 213, 214, and 215. The ME unit performs tracking task during ME tracking period 222, 223, 224, and 225. Measurements 262, 263, 264, and 265 are generated at the end of ME tracking period 222, 223, 224, and 225, respectively. In one embodiment, the ME tracking period has a period length of 201. The ME tracking period length 201 is configured by the GNSS power saving manager based on GNSS positioning data, such as GNSS signal conditions and GNSS user requirements. Similarly, PE working period has a period length of 202. PE working period length 202 is configured by the GNSS power saving manager based on GNSS positioning data, such as GNSS signal conditions and GNSS user requirements. The ME tracking period and PE working period are configured independently by GNSS power saving manager. The ME tracking period and the ME intervals are updated dynamically according to the GNSS positioning data. The PE working period and the PE intervals are updated dynamically according to the GNSS positioning data. The position interval is the period between two position result outputs. For example, the position interval with a period length of 203 is the time difference between position result 251 and 252. The position interval can be configured through a user interface or through a network interface. It can also be predefined.

Figure 3:
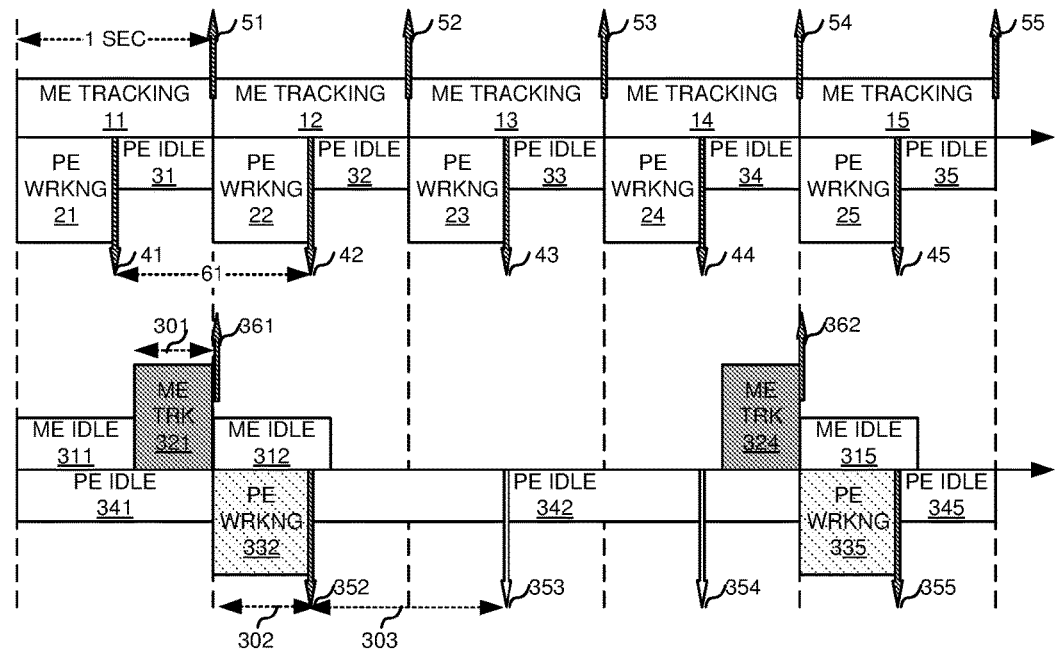
FIG. 3 shows an exemplary diagram of using acceptable provision estimated position fix for power saving in accordance with embodiments of the current invention.

FIG. 3 shows an exemplary diagram of using acceptable provision estimated position fix for power saving in accordance with embodiments of the current invention. In one embodiment, the ME tracking period and the PE working period together with the ME interval and the PE interval are generated by the GNSS power saving manager similarly as shown in FIG. 2. Further power saving is implemented by using acceptable provision estimated position fix to save more power. In this embodiment, the ME tracking is arranged periodically according to the required GPS position fix interval. For example, as shown in FIG. 3, the required GPS position fix is one-second with period length of 303. The ME tracking period 321 is generated by the GNSS power saving manager similarly as in FIG. 2 with a period length of 301. At the end of ME tracking period 321 and 324, measurements 361 and 362 are generated, respectively.

Accordingly, PE working periods are also arranged periodically according to the required GPS position fix interval. PE working period 332 and 335 are configured by the GNSS power saving manager. Position results 352 and 355 are generated at the end of PE working periods 332 and 335, respectively. Based on GNSS positioning data, such lower requirement in user requirements of accuracy, PE idle period 342 can be longer than the required GPS position period length 301. In one embodiment, to meet the requirement of GPS position interval, estimated position is generated at each GPS position interval if there is no position result generated by the PE working period. For example, estimated position results 353 and 354 are generated at GPS required intervals in between position results 352 and 355. Using the estimated position allows the ME unit and PE unit to stay in idle mode for a longer time to save power further while meeting the user requirements of GPS position interval. In one embodiment, estimated results 353 and 354 are computed by extra and interpolation from the recent position fix 352.

Figure 4:
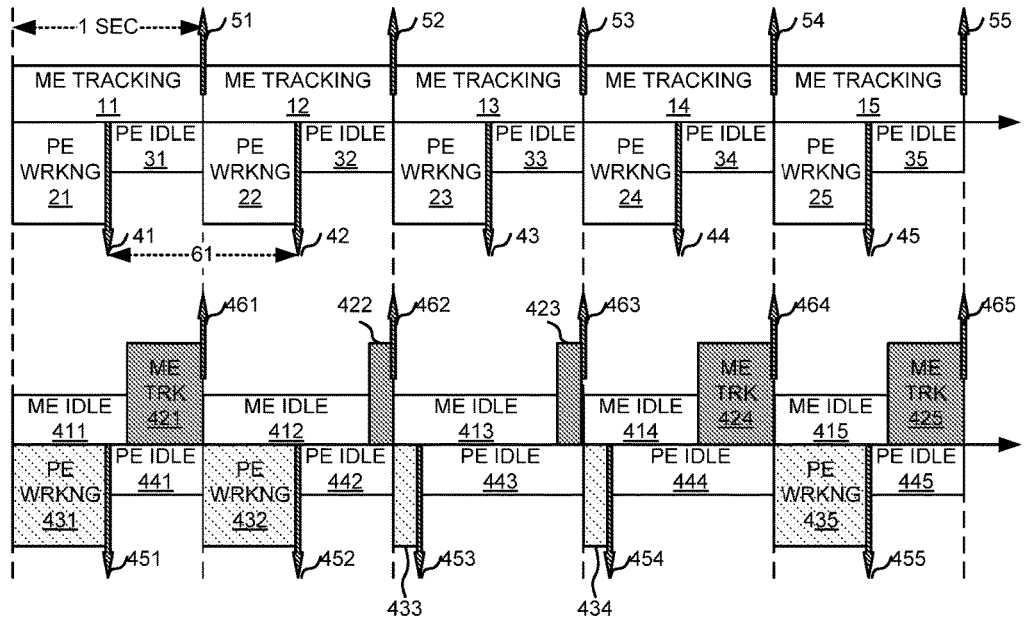
FIG. 4 shows an exemplary diagram of using acceptable lower position accuracy methods for power saving in accordance with embodiments of the current invention.

FIG. 4 shows an exemplary diagram of using acceptable lower position accuracy methods for power saving in accordance with embodiments of the current invention. In one embodiment, the GNSS power saving manager determines that a lower position accuracy is acceptable according to GNSS positioning data, such a user requirement data. The GNSS power manager configures the ME-tracking and/or the PE-working dynamically to be adjusted to minimum operation needs by using ME-partial (MEP) and/or PE-partial (PEP). For example, in MEP mode, the ME unit only executes tracking task and is activated in the minimum signal integration time. In the PEP mode, for example, the PE unit executes partial PE's software stack, such as only operates time-update task or time-update and measurement-update tasks. The PEP mode can be configured to operate in other modes to achieve minimum operation.

In one embodiment, the ME unit operates under MEP is dynamically arranged according to signal intensity and/or user's motion status. For example, when the signal condition is good and/or when the user's motion status is stable, the MEP mode can be adapted. Accordingly, when MEP mode is configured, PEP is arranged aligned with MEP. As shown in FIG. 4, ME tracking periods 421, 422, 423, 424, and 425 are configured. Measurements results 461, 462, 463, 464, and 465 are generated at the end of ME tracking periods 421, 422, 423, 424, and 425, respectively. ME idle periods 411, 412, 413, 414, and 415 occupies the rest of ME interval corresponding to ME tracking periods 421, 422, 423, 424, and 425, respectively. Position results 451, 452, 453, 454, and 455 are generated at the end of PE working periods 431, 432, 433, 434, and 435, respectively. PE idle periods 441, 442, 443, 444, and 445 occupies the rest of PE interval corresponding to PE working periods 431, 432, 433, 434, and 435, respectively. In one embodiment, upon determining certain GNSS conditions, the GNSS power saving manager configures MEP periodically. ME tracking periods 422 and 422 are configured with a shorter period to perform MEP to further save power. Accordingly, PE working period 433 and 434 are configured with a shorter period to perform PEP.

Configuring ME tracking period and PE working period dynamically based on GNSS positioning data, allows the GNSS receiver to effectively saving power consumption. Further optimization is achieved to allow estimated position or using MEP/PEP upon determining certain conditions, such as a lower requirement for position accuracy. All the above methods operate with ME-tracking and PE-working operate sequentially because the PE working uses the output of the ME tracking to calculate the position. In GNSS architecture, when the PE unit is working, the ME unit should at least stay at idle to provide the clock for the processor of PE. In one embodiment, the ME-tracking period and PE-working period are aligned to save the power consumption further.

Figure 5:
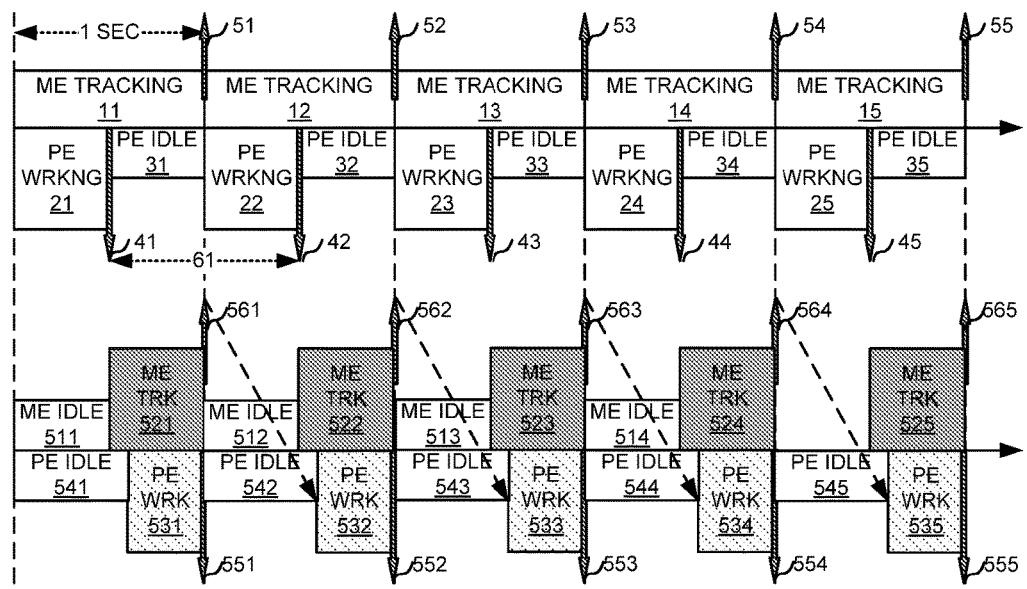
FIG. 5 shows an exemplary diagram to delay position fix such that the ME-tracking period and PE-working period are aligned in accordance with embodiments of the current invention.

FIG. 5 shows an exemplary diagram to delay position fix such that the ME-tracking period and PE-working period are aligned in accordance with embodiments of the current invention. ME tracking periods 521, 522, 523, 524, and 525 are configured. Measurements results 561, 562, 563, 564, and 565 are generated at the end of ME tracking periods 521, 522, 523, 524, and 525, respectively. ME idle periods 511, 512, 513, 514, and 515 occupies the rest of ME interval corresponding to ME tracking periods 521, 522, 523, 524, and 525, respectively. Position results 551, 552, 553, 554, and 555 are generated at the end of PE working periods 531, 532, 533, 534, and 535, respectively. PE idle periods 541, 542, 543, 544, and 545 occupies the rest of PE interval corresponding to PE working periods 531, 532, 533, 534, and 535, respectively. In one embodiment, PE working period 532 is delayed such that PE working period 532 is aligned with ME tracking period 522. Measurement result 561 is stored and passed to the PE unit to be used for calculation during PE working period 532. The position result is generated based on a last epoch's measurement obtained in the previous ME tracking period. Similarly, PE working period 533, 534, and 535 are delayed such that PE working period 533, 534, and 535 are aligned with ME tracking period 522, 523, 524, and 525, respectively. Measurement results 562, 563, and 564 are stored and passed to the PE unit to be used for calculation during PE working period 533, 534, and 535, respectively.

Figure 6:
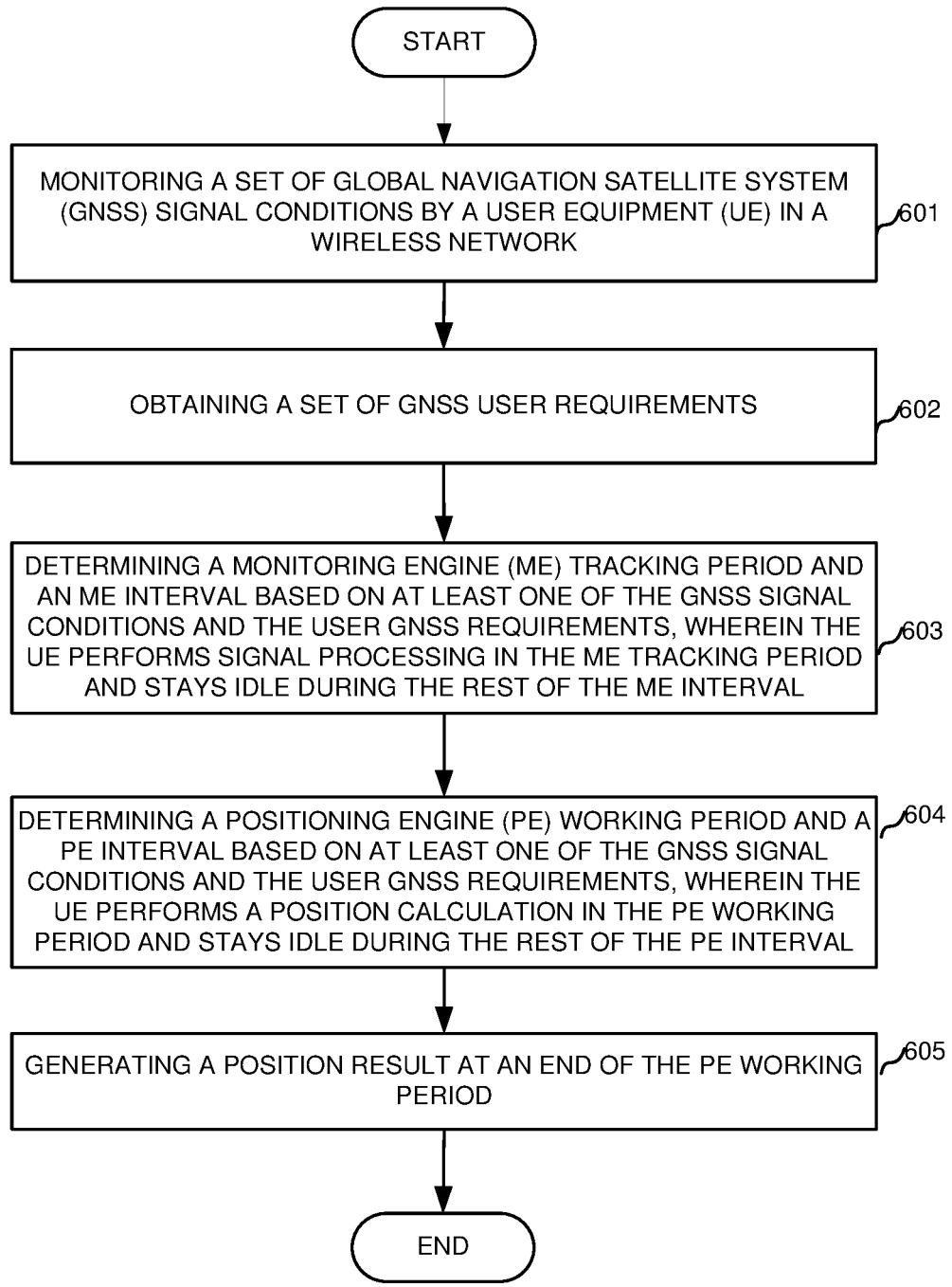
FIG. 6 shows an exemplary flow chart of power saving for GNSS receiver in accordance with embodiments of the current invention.

FIG. 6 shows an exemplary flow chart of power saving for GNSS receiver in accordance with embodiments of the current invention. At step 601, the GNSS receiver monitors a set of global navigation satellite system (GNSS) signal conditions in a wireless network. At step 602, the GNSS receiver obtains a set of GNSS user requirements. At step 603, the GNSS receiver determines a monitoring engine (ME) tracking period and an ME interval based on at least one of the GNSS signal conditions and the user GNSS requirements, wherein the UE performs signal processing in the ME tracking period and stays idle during the rest of the ME interval. At step 604, the GNSS receiver determines a positioning engine (PE) working period and a PE interval based on at least one of the GNSS signal conditions and the user GNSS requirements, wherein the UE performs a position calculation in the PE working period and stays idle during the rest of the PE interval. At step 605, the GNSS receiver generates a position result at an end of the PE working period.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method for controlling a power saving operation, applied to an apparatus comprising a global navigation satellite system (GNSS) receiver, a monitoring engine (ME) module and a positioning engine (PE) module, the method comprising:
   monitoring, by a GNSS signal condition monitor, a set of GNSS signal conditions by the GNSS receiver in a wireless network;
   obtaining, by a GNSS user requirements handler, a set of GNSS user requirements;
   changing, by a GNSS power saving manager, a length of a ME tracking period in response to a change in at least one of the set of GNSS signal conditions related to a power saving operation and the set of GNSS user requirements related to a power saving operation, wherein the GNSS receiver performs a position calculation in a PE working period; and
   generating, by a position generator, a position result at an end of the PE working period.

2. The method of claim 1, wherein the set of GNSS signal conditions comprises at least one of:
   an intensity of satellite signal, a number of satellites, and satellite orbit data.

3. The method of claim 1, wherein the set of GNSS user requirements comprises at least one of:
   a user power requirement, a user position accuracy requirement, a user motion status, and a position update interval.

4. The method of claim 3, wherein the ME tracking period and the PE working period are arranged periodically according to the position update interval.

5. The method of claim 4, wherein a ME interval and a PE interval are greater than the position update interval, further comprising:
   estimating a position result at each position update interval if no position result is generated by the PE working period.

6. The method of claim 5, wherein the position estimation is computed by interpolation from a last position update results by the PE working period.

7. The method of claim 1, wherein one or more ME-partial (MEP) periods are dynamically arranged upon detecting one or more MEP triggering events, wherein the GNSS receiver executes only a tracking task and is activated with minimum signal integration time during the one or more MEP periods.

8. The method of claim 7, wherein the one or more MEP triggering events comprises at least one of:
a position accuracy is below a predefined accuracy threshold, a signal condition is above a predefined signal threshold, and a user motion is below a predefine motion threshold.

9. The method of claim 7, further comprising:
aligning a PEP period with each MEP period, wherein the GNSS receiver executes a partial PE's software stack during the PEP period.

10. The method of claim 1, further comprising:
aligning the PE working period with the ME tracking period such that the PE working period overlaps with the ME tracking period, wherein the GNSS receiver performs the position calculation in the PE working period based on a last epoch's measurement obtained in a previous ME tracking period.

11. An apparatus can perform a power saving operation, comprising:
a global navigation satellite system (GNSS) RF receiver that receives satellite radio signal in a wireless network;
a GNSS signal condition monitor that monitors a set of GNSS signal conditions;
a GNSS requirement handler that obtains a set of GNSS user requirements;
a power saving manager that changes a length of a ME tracking period in response to a change in at least one of the set of GNSS signal conditions related to a power saving operation and the set of GNSS user requirements related to a power saving operation;
an ME module that performs signal processing in the ME tracking period of an ME interval and stays idle during the rest of the ME interval;
a PE module that performs a position calculation in a PE working period of a PE interval and stays idle during the rest of the PE interval; and
a position generator generating a position result at an end of the PE working period.

12. The apparatus of claim 11, wherein the set of GNSS signal conditions comprise at least one of:
an intensity of satellite signal, a number of satellites, and satellite orbit data.

13. The apparatus of claim 11, wherein the set of GNSS user requirements comprise at least one of:
a user power requirement, a user position accuracy requirement, a user motion status, and a position update interval.

14. The apparatus of claim 13, wherein the ME tracking period and the PE working period are arranged periodically according to the position update interval.

15. The apparatus of claim 14, wherein the ME interval and the PE interval are greater than the position update interval, further comprising:
a position estimator that estimates a position result at each position update interval if no position result is generated by the PE working period.

16. The apparatus of claim 15, wherein the position estimation is computed by interpolation from a last position update results by the end of the PE working period.

17. The apparatus of claim 11, wherein one or more ME-partial (MEP) periods are dynamically arranged upon detecting one or more MEP triggering events, wherein the apparatus executes only a tracking task and is activated with minimum signal integration time during the one or more MEP periods.

18. The apparatus of claim 17, wherein the one or more MEP triggering events comprise at least one of:
a position accuracy is below a predefined accuracy threshold, a signal condition is above a predefined signal threshold, and a user motion is below a predefine motion threshold.

19. The apparatus of claim 17, further comprising:
aligning a PEP period with each MEP period, wherein the apparatus executes a partial PE's software stack during the PEP period.

20. The apparatus of claim 11, further comprising:
aligning the PE working period with the ME tracking period such that the PE working period overlaps with the ME tracking period, wherein the apparatus performs the position calculation in the PE working period based on a last epoch's measurement obtained in a previous ME tracking period.

* * * * *